Nov. 20, 1923.

H. STROHBACH

COFFEE URN

Filed Oct. 2, 1922    2 Sheets-Sheet 1

1,474,858

Inventor:
Henry Strohbach,
By Frederick V. Winters,
Attorney

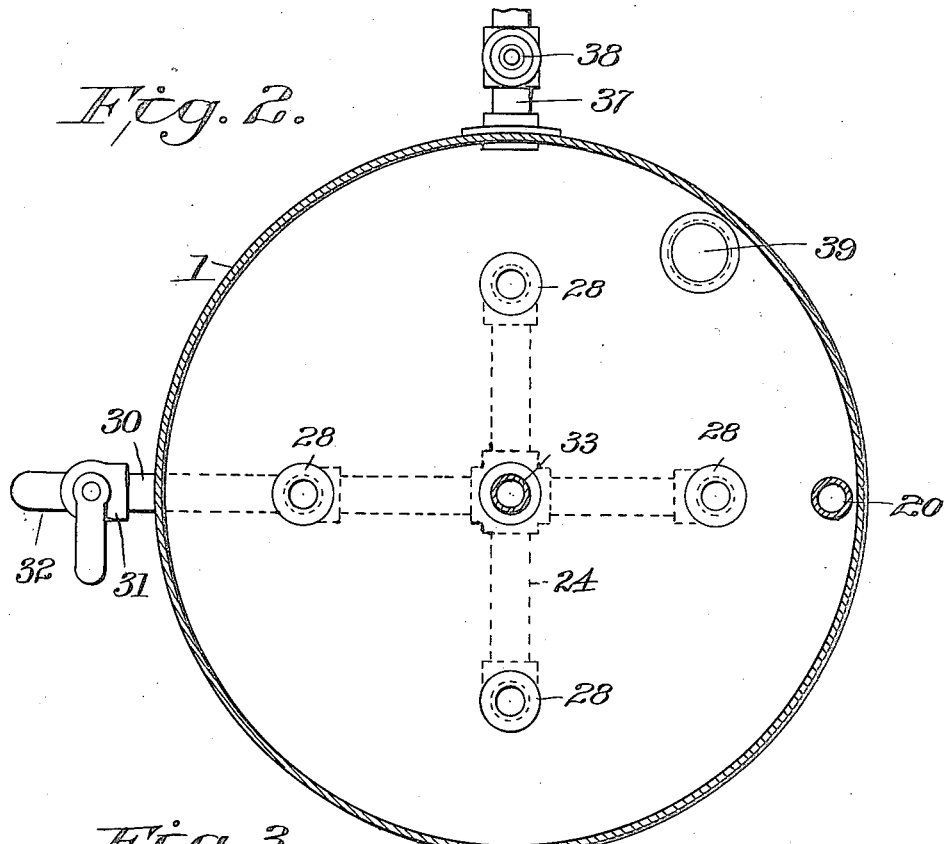
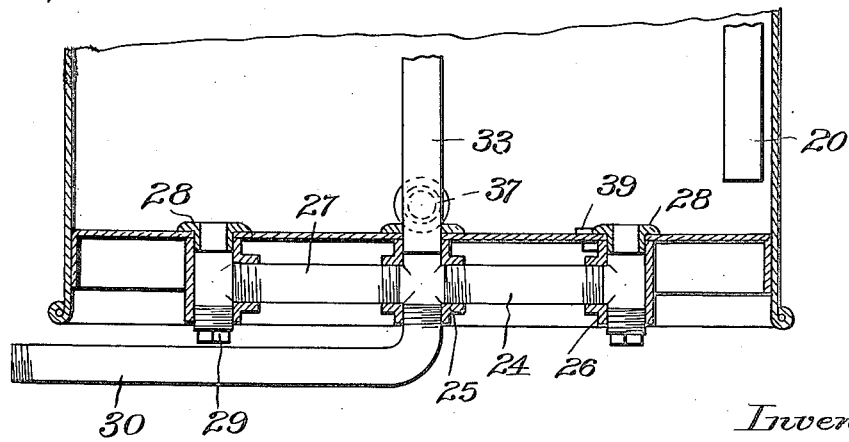

Patented Nov. 20, 1923.

1,474,858

UNITED STATES PATENT OFFICE.

HENRY STROHBACH, OF NEW YORK, N. Y.

COFFEE URN.

Application filed October 2, 1922. Serial No. 591,980.

*To all whom it may concern:*

Be it known that I, HENRY STROHBACH, a citizen of the United States, residing at New York, in the county and State of New York, have invented certain new and useful Improvements in Coffee Urns, of which the following is a full, clear, and exact specification.

This invention relates to coffee urns or coffee making machines for use in restaurants, hotels and lunch rooms, and has for its object to provide a machine of this kind which is more efficient and durable than those heretofore used.

A special object is to protect the extract receptacle, which is preferably made of earthenware, against cracking by reason of direct contact of boiling water therewith. Another object is to promote and improve the circulation of the hot water in the boiler chamber of the machine, so that said water may be brought to the boiling point more quickly than in prior constructions and a saving in fuel may also be effected. A further object is to provide for drawing off water from the upper portion of the boiler chamber for use in making tea or other purposes. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 2 is a horizontal section on the line II—II of Figure 1, and

Figure 3 is a detailed vertical section of the lower portion of the boiler chamber and water circulating device below the same.

Figure 1:
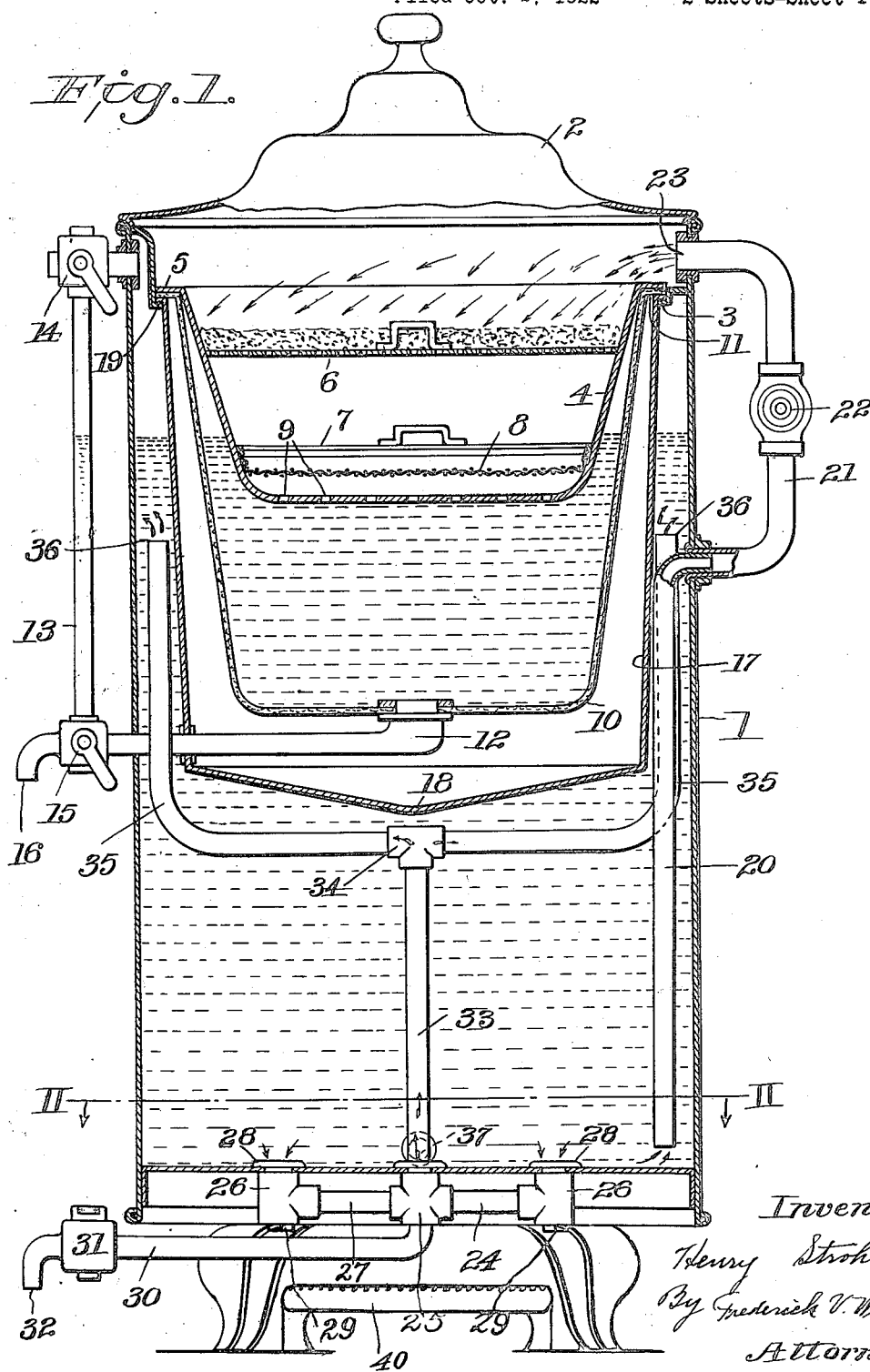
Figure 1 is a central vertical section of a coffee urn constructed substantially in accordance with this invention.

The coffee machine comprises an outer casing 1 of cylindrical shape and fitted with a removable cover 2. A short distance below the upper edge of the casing a ledge 3 is provided on the inside thereof for supporting a percolator 4, an extract receptacle 10 and protecting oven or casing 17. Said oven or protecting casing for the earthenware extract receptacle 10 is preferably made of metal and spaced away from said receptacle as shown. Around the upper edge of said oven there is an outwardly extending horizontal flange 19 resting directly upon the ledge 3. The extract receptacle 10 has a similar flange 11 at its upper edge which rests upon the flange 19 of the oven, and the percolator 4 also has a flange 5 which rests upon the flange 11 of the extract receptacle, whereby all of said vessels are supported by said ledge.

The percolator 4 is provided with a perforated plate 6 on which the ground coffee is placed and below said plate a strainer 8 may be located the same having a handle-supporting cross bar 7 by which it may be removed. The bottom of the percolator 4 is perforated at 9 to permit the coffee extract to flow down into the extract receptacle 10. A pipe 12 is connected to the bottom of said receptacle 10 and passes horizontally through the walls of the receptacle and outer casing, being fitted at its outer end with a nozzle 16 controlled by a valve 15 by means of which the coffee extract may be drawn off as desired. A gauge tube 13 may be arranged between the valve 15 and another valve 14 communicating with the outer casing higher up for showing the level of the extract in the receptacle 10. The bottom of the oven or protecting vessel 17 may be dished, as at 18, if desired.

Below the bottom of the outer casing 1 of the machine a cross-shaped water heating and circulating device 24 is arranged the same comprising radially arranged pipes or tubes 27 extending horizontally outward from a central coupling 25 to T-couplings 26 at the outer ends of said pipes. Said T-couplings have water-tight connections with the bottom of the casing 1 as shown at 28 in Figures 2 and 3, while the lower ends of said T-couplings are stopped by plugs 29. The central coupling 25 is also connected through the bottom of the casing 1 with an upwardly extending pipe 33 which reaches vertically upward to a point adjacent the bottom of the oven 17 and there branches at 34 into two or more angular tubes 35 reaching up between the oven and outer casing walls for a considerable distance so as to deliver the hot water around said oven walls where it will act directly and most quickly to heat the coffee in the extract receptacle 10 without danger of cracking or breaking said earthenware receptacle as might be the case if the hot water came in contact with the same and the protecting casing or oven 17 were not provided. The central coupling 25 is also connected by a pipe 30 with a nozzle 32 controlled by a valve 31 by means of which hot water may be drawn from the upper portion of the casing 1 where the upper ends of the branch pipes 35 are arranged at 36, for use in making tea or other purposes. It will be noted that in this way the hottest water, which is in the upper part of the casing 1, may be drawn off through the bottom of said casing by reason of the pipe 33 and branch pipes 35 arranged as shown and described.

A pipe 20 is arranged partially in the casing 1 and has a portion 21 arranged outside the same and fitted with a valve 22. The lower end of said pipe extends below the water level in the casing 1 while the upper end thereof enters said casing at 23 above the ledge 3. Water may be let into the casing through a pipe 37 controlled by a valve 38, and may be let out via a capped opening 39.

In operation, when the machine is charged as shown in Figure 1 and the burner 40 below the circulating device 24 is lighted, the cooler water from the bottom of the casing 1 is drawn into said circulating device 24 through the upper open ends 28 of the T-couplings and discharged through the pipe 33 and branch pipes 35. As soon as the water in the casing 1 becomes hot enough to generate sufficient steam pressure, opening of the valve in the pipe section 21 will result in hot water being forced up through the pipe 20 and pipe section 21 and discharged as indicated by the arrows upon the ground coffee in the percolator 4 where it will extract the essence therefrom in the usual way, said coffee extract being collected in the receptacle 10 from which it is drawn via pipe 12 and nozzle 16 as required. The heating of the water in the casing 1 is expedited by the provision of the circulating device 24 and the branched pipe 33, said cross-shaped circulating device being arranged directly over the burner, and said branched pipe reaching up well around the extract receptacle 10 and the oven 17 inclosing it.

I claim:—

1. In a coffee machine, the combination with a water boiler, of an extract receptacle arranged therein, a percolator in the upper portion of said receptacle, a protecting casing for the extract receptacle surrounding the same and spaced therefrom for the purpose specified, and a ledge in the upper portion of said boiler on which said percolator, extract receptacle and protecting casing are all supported.

2. In a coffee machine, the combination with a water boiler, of a circulating device arranged below the bottom of said boiler, said circulating device having ports opening through the bottom of the boiler for the intake of water therefrom, and a water discharge pipe leading from said circulating device well up into said boiler.

3. In a coffee machine, the combination with a water boiler, of a cross-shaped circulating device arranged below the bottom of said boiler, said circulating device having ports at the outer ends of its arms for the intake of water from said boiler, and a water discharge pipe leading from the center of said circulating device well up into the boiler for the purpose specified.

4. In a coffee machine, the combination with a water boiler, of a circulating device arranged below the bottom of said boiler and having intake and discharge passages in communication with the boiler, and a pipe connected to said circulating device for drawing off water directly from the same for the purpose specified.

5. In a coffee machine, the combination with a water boiler, of an extract receptacle arranged therein, a circulating device below the bottom of the boiler, said device having intake ports opening through the bottom of the boiler, and a discharge pipe leading from said circulating device into the boiler and terminating adjacent the extract receptacle.

6. In a coffee machine, the combination with a water boiler, of an extract receptacle arranged therein, a circulating device below the bottom of the boiler, said device having intake ports opening through the bottom of the boiler; and a discharge pipe leading from said circulating device into the boiler and terminating therein above the bottom of said extract receptacle.

7. In a coffee machine, the combination with a water boiler, of an extract receptacle arranged therein and having its walls spaced from those of the boiler, a circulating device below the bottom of the boiler and having ports opening through the bottom thereof for the intake of water, and a discharge pipe leading from said circulating device into the boiler and having branches reaching up between the walls of the boiler and extract receptacle for the purpose specified.

8. In a coffee machine, the combination with a water boiler, of an extract receptacle arranged therein, an air jacket surrounding said receptacle and spaced from the walls of the casing, a circulating device below the bottom of the boiler and having intake ports opening through the bottom thereof, and a discharge pipe leading from the circulating device into the boiler and terminating between the walls of the casing and air jacket for the extract receptacle.

In testimony whereof, I have signed my name to this specification.

HENRY STROHBACH.